Nov. 9, 1965
G. HAINKE
3,216,810
METHOD AND APPARATUS FOR THE
MANUFACTURE OF ARMORED GLASS
Filed Sept. 25, 1961
4 Sheets-Sheet 1
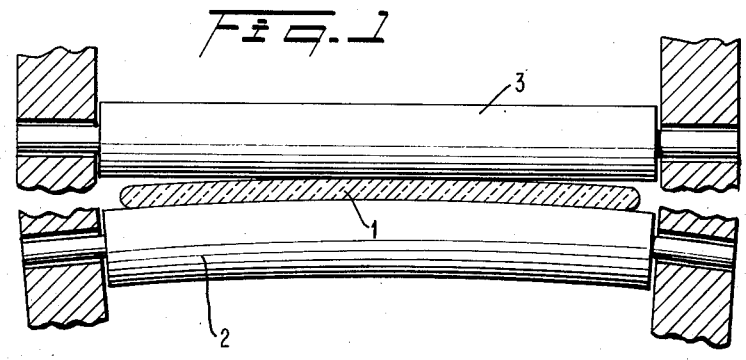
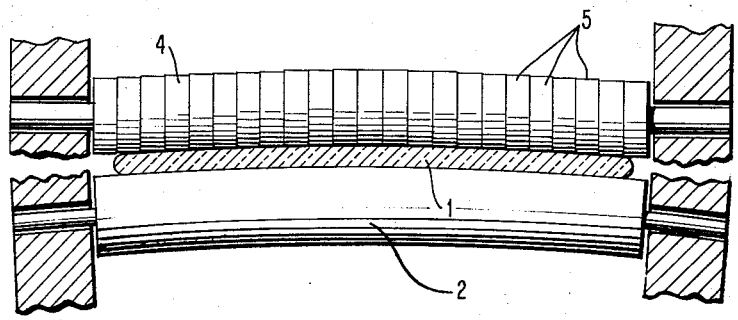
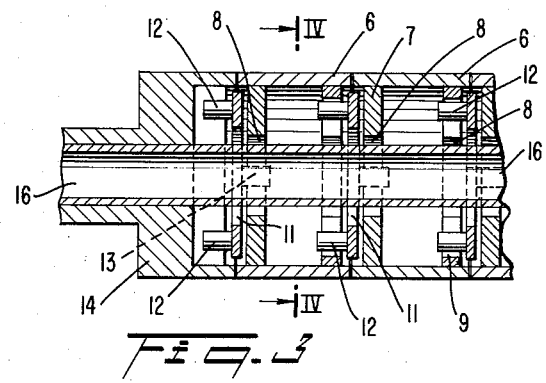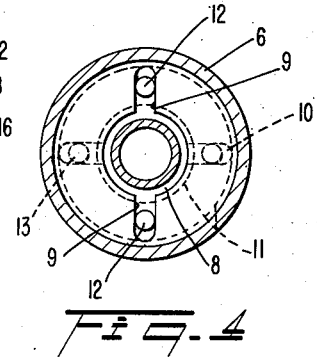
INVENTOR.
GEORG HAINKE
BY *Bauer and Seymour*
ATTORNEYS

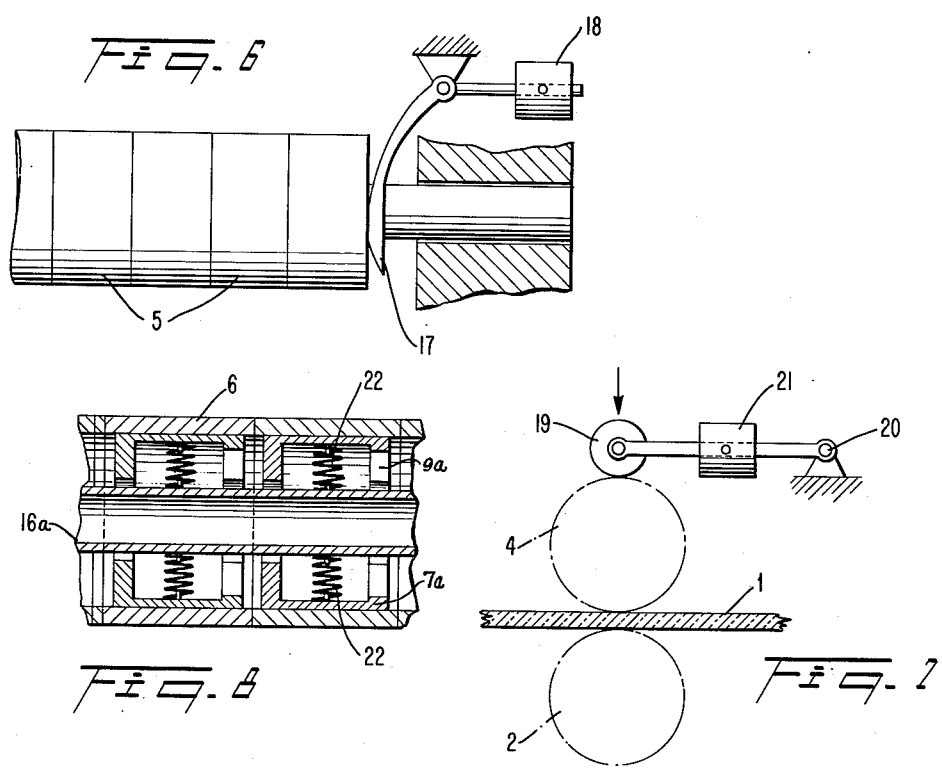

INVENTOR.
GEORG HAINKE

Nov. 9, 1965 G. HAINKE 3,216,810
METHOD AND APPARATUS FOR THE
MANUFACTURE OF ARMORED GLASS
Filed Sept. 25, 1961 4 Sheets-Sheet 4

INVENTOR.
GEORG HAINKE
BY
Bauer and Seymour
ATTORNEYS

United States Patent Office 3,216,810
Patented Nov. 9, 1965

3,216,810
METHOD AND APPARATUS FOR THE MANUFACTURE OF ARMORED GLASS
Georg Hainke, Stolberg, Germany, assignor to Compagnie de Saint-Gobain, Neuilly-sur-Seine, France
Filed Sept. 25, 1961, Ser. No. 140,581
Claims priority, application France, Oct. 7, 1960,
840,561; 840,562
9 Claims. (Cl. 65—51)

This invention relates to armored glass and a method of making it, to a novel apparatus for rolling glass sheet, to the production of sheet of more uniform thickness by rolling methods, and to a means and method of compensating for the distortion of sheet forming rollers. It also relates to the making of plastic sheet other than glass, for instance sheet of organic, resinous plastics, by rolling, but as the method and means are particularly adapted to the making of glass sheet, the description will be directed to that use.

To make glass sheet by rolling two rollers are used, of rigid surface and parallel axes, between which the molten glass passes, the spacing of the rollers fixing the thickness of the sheet. To obtain a flat sheet of uniform thickness, it is necessary that the generatrices of the cylinder remain straight and do not become curved by distortion of the cylinder during use. In practice because of the high temperature of the rolling operation and the pressure employed, the rollers, particularly the lower roller, may become elongated and the surface become curved, producing sheet of uneven thickness, and the circumferential speed of the rollers is different at different places, introducing surface distortion in the sheet.

By introducing a second roller, a better appearance can be obtained, but it is almost impossible to employ fixed bearings for the upper roller, because one cannot so exactly conform the speed and the spacing of the second pair of rollers to those of the first pair as to eliminate surface crimping or elongation of the sheet. Attempts have been made to mount the upper roller of the second pair on vertically movable bearings balanced by oscillating levers, but even then uniform contact of the upper roller throughout the width of the band is not obtained, and the sheet appears with unsightly markings.

In the making of armored glass the foregoing problems are increased because it is necessary to provide against the tinting of the glass by metal oxide on the wire armor and against the retention of bubbles by the glass. In a known process the molten glass passes from a furnace between two rollers, the wire mesh being introduced shortly before the rollers, but at the temperature of fused glass, oxidation takes only a fraction of a second and the very high temperature of the glass favors the entrainment of bubbles in the glass. An ancillary difficulty is to support the sheet between the two pairs of rollers. If dragged over a smooth surface or even carried by a roller, some marking may occur, and it is an object to support a sheet between rollers unmarked.

It is an object of the invention to roll molten glass into a sheet of uniform thickness, and to compensate for imperfections in the rollers. Another object is to provide an improved apparatus for rolling glass sheet. Another object is to make armored glass by an improved process, and to provide novel apparatus for the purpose. It is another object to overcome the several imperfections of the prior art which have been listed above. Other objects will be in part apparent and in part set forth elsewhere herein.

The objects are accomplished generally speaking by a method of making armored glass which comprises forming a sheet of glass, and while the sheet is plastic, sinking reinforcing armor into the glass through a surface thereof, thereby leaving grooves in the surface of the glass, closing the grooves in the glass by pressing the sides of the grooves together and smoothing the surface of the glass above the armor while the glass is still plastic, and cooling the sheet; and by glass sheet rolling apparatus comprising a supporting roller and a pressure applying roller which are spaced apart a distance which establishes the thickness of the glass sheet, the pressure applying roller being comprised of cylindrical sections having independent radial motion. Another object is accomplished by the method of supporting a moving glass sheet between rollers that comprises forcing a stream of fluid against the surface of the glass between the rollers.

In the present invention improvement is secured by the use of a roller having a plurality of cylindrical sections susceptible of relative radial displacement, which are so coupled that the peripheral speed of each is the same. In this way the upper roller of the second pair automatically adapts itself to the face of the glass sheet, and the generatrices are no longer rectilinear but are formed of numerous parallel generatrices in echelon, the peripheral speed of all of them remaining the same. The sheet forming roller is thus a complex formed of several small, abutting rollers having relatively movable axes and individual drive without surface interruptions to accommodate bearings.

In introducing armor into the glass after rolling, according to the present invention the glass is still plastic but cold enough to retain the grooves made by the wire, the grooves are closed, expelling the gases from the grooves or crevices, by folding the leading edges of the crevices upon the following edges, successively and preferably by rolling pressure. By using relatively cold glass, still plastic, the speed of oxidation is sharply reduced, and the gases which tend to form near the wire at higher temperature are either not formed or are forced out by the closing of the crevices.

In the drawings, wherein like reference characters refer to like parts throughout the several views, FIG. 1 is a diagrammatic view in elevation of rolling conditions existing between old rollers in an apparatus of the prior art, somewhat exaggerated for clarity of presentation;

FIG. 2 is a like view illustrating the apparatus of this invention;

FIG. 3 is a vertical section to an enlarged scale, through a roller such as the upper roller of FIG. 2;

FIG. 4 is a section on line IV—IV of FIG. 3;

FIGS. 5 and 5a are variants of FIG. 4;

FIG. 6 is a diagrammatic elevation of pressure means axially applied to keep the sections in circumferential contact;

FIG. 7 illustrates means for applying pressure to the roller sections;

FIGS. 8 and 9 are vertical and cross sections of a modification of the sectional suspending means;

Figure 10:
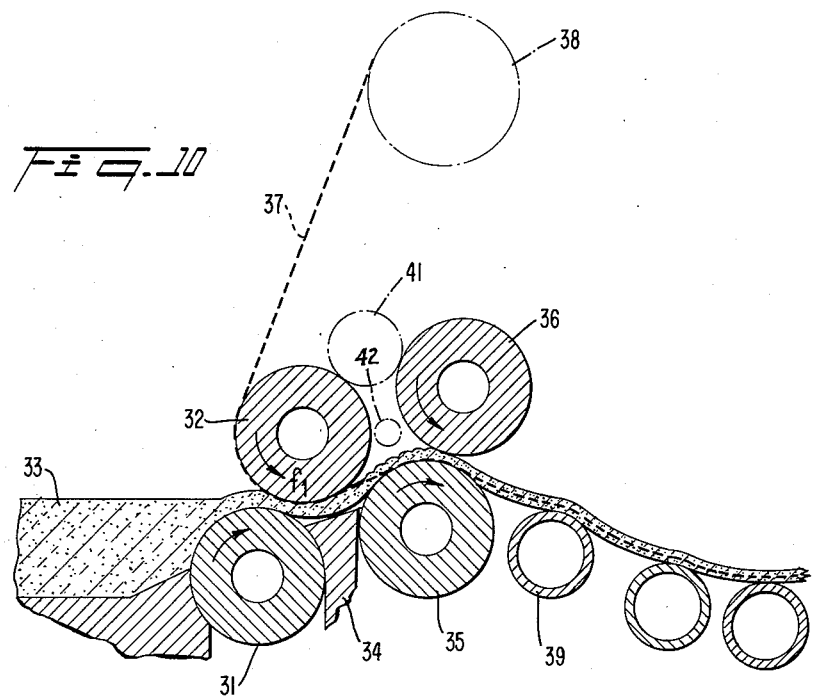
FIG. 10 is a vertical cross section through a sheet rolling and armoring machine.

In FIGS. 1 and 2 has been shown a sheet of glass 1 laterally bent because of the deformation of the lower roller 2. In the construction of FIG. 1 the upper rigid roller 3 is not in contact except with the mid-part of the sheet of which the edges, because of this fact, are not provided with surface improvement contrary to the object of the process.

On the contrary, roller 4 of FIG. 2, in conformity with the invention, is in continuous contact with the sheet of glass. In effect, the cylindrical elements 5 constituting the non-rigid roller adjust themselves in position so that they uniformly touch the surface of the band throughout its width. It is to be noted, thus, that when the speeds of rotation of the cylindrical elements are equal, their friction against or skidding on the glass is eliminated. Especially, the slight deviation of these elements one from the other does not make markings on the face of the sheet due to the fact that, in this invention, the glass has already attained substantial viscosity.

All of the cylindrical sections are duplicates. Each comprises a cylindrical tube 6 of refractory steel having a pair of discs 7 each fitting and contiguous a respective end of the tube and fixed therein, as by brazing. As clearly shown upon FIGURE 4, each disc is a washer-like item having a pair of diametrically-opposed slots such as 9, extending radially outward from its central circular opening. Inspection of FIGURE 4 shows that the two discs of each tube are fixed therewithin so that the two diameters determined by the respective pairs of slots 9 and 10 are mutually normal.

The two confronting discs 7 of each contiguous pair of rollers 5, are axially spaced a distance sufficient to receive between them a coupling or connector disc 11. Inspection of FIGURES 3 and 4 shows that each coupling disc is also a washer-like item having an outer diameter somewhat less than the inner diameter of the tube sections and a central circular aperture of a diameter a little greater than the corresponding dimension of discs 7.

A first pair of bearing pins 12 are fixed to and extend from one face of each coupling. Likewise a second pair of these pins are fixed to and extend from the other face of each coupling 11. Each pair of pins is positioned in and along a diameter of its disc. The two diameters thus determined are mutually normal. Each pin is sized for a smooth bearing fit within a respective one of the slots in discs 7 and is located approximately mid-way between its inner and outer peripheries. The coupling of the cylindrical elements between themselves is thus positive circularly but permits relative vertical movement by gravity independently of each other. This coupling especially assures the transmission of rotation from one cylindrical section to another from the section at the head of the roller which is driven by any appropriate means. Even when the cylindrical elements are relatively displaced, their peripheral speeds are the same. The sectional roller is completed by a central tube 16 passing with adequate clearance through the central apertures of all discs, and through which may be circulated a liquid or gas for heating or cooling purposes.

The cylindrical elements 5 are advantageously pressed against each other in order to assure continuity of the rolling surface and this is accomplished by means such as lever 17 (FIG. 6) provided with a counterweight 18 on the side opposite the drive 14. The cylindrical elements 5 apply the rolling pressure by their own weight. If that is not sufficient, one may augment the pressure at will as is shown in FIG. 7 by means of a wheel 19 mounted on a lever 20 provided with movable weight 21. This weight may naturally be replaced by equivalent means, for example springs of selective force.

In FIGURES 8 and 9 the driving connection between contiguous tube or roller sections is identical with that just described in connection with FIGURES 4 and 5, but instead of two discrete discs 7, each roller section 6 has a single cylindrical sleeve insert 7a fitting therewithin. The ends of each sleeve are inwardly flanged as clearly shown upon FIGURE 8, to define circular central openings extending with ample clearance about tube 16. Each flange of each roller section has a pair of diametrically-opposite, radially-extending slots 9a with the two diameters thus determined, mutually normal. Each adjacent pair of flanges of successive roller sections define a space between them which, as in the construction shown upon FIGURES 2 and 3, accommodates a disc which may be identical with the one depicted at FIGURES 3 and 4 and which, in the manner previously described, connects the roller sections for synchronous rotation.

Each roller section 6 may include three coil springs 22 which are equiangularly disposed radially of and about the central axis of the section in a common plane normal to the aforesaid axis and mid-way of the ends of the section. Each spring bears at its radially outward end against the inner periphery of its sleeve, and at its inward end in sliding contact with and against tube 16a whereby, in an obvious way, each set of three springs acts to yieldingly urge its roller section to a position wherein its axis is coincident with the axis of tube 16a.

FIGURES 5 and 5a show a modification wherein the pins 12a are fixed to the end flanges of sleeve 7b instead of to discs 11 as in the case of FIGURES 3 and 4, while each disc 11a has two pairs of equiangularly-spaced radial slots each pair receiving with a smooth fit a corresponding pair of pins 12a of two contiguous roller sections. In the modification here being described, the sleeve will have the same general form as that described in connection with FIGURES 8 and 9, supra, and it is for this reason that two pins 12a are indicated by dotted lines upon FIGURE 5. However, the same construction can be adapted to the form shown at FIGURES 3 and 4, wherein discrete discs 7 are used. In such a construction, of course, each disc will bear but two diametrically-opposite pins 12a. In both cases the operation is essentially identical with that described for FIGURES 3 and 4, such that all roller sections, while free to partake of limited individual movement transversely of the rotational axis, are connected and constrained to rotate as a unit, at the same peripheral speed.

The apparatus for armoring of glass includes rollers 31 and 32 which may or may not be of equal diameter. They entrain rotation together or separately in direction f1 and may be cooled by any known means, for instance by internal circulation of the fluid. The liquid glass 33, rolled between rollers 31 and 32, is received upon a support 34, then accepted by lower roller 35 of the second rolling pair which cooperates with upper roller 36. The metal wire screen 37 coming from a roll 38 is trained around roller 32 and pressed thereby into the surface of the plastic glass entering between rollers 31 and 32, after which it is embedded into the glass sheet. According to the invention, the roller 35 which supports the band of laminated glass after it leaves roller 31 forms a camelback over the upper surface of roller 35 which causes the penetration of the wires of the screen into the still-plastic glass. The upper surface of the glass, cooled by contact with roller 32, is softened by the internal heat of the glass itself during its course toward the roller 36, so that it may be readily penetrated by the wires, but leaving crevices above it.

Figure 12:
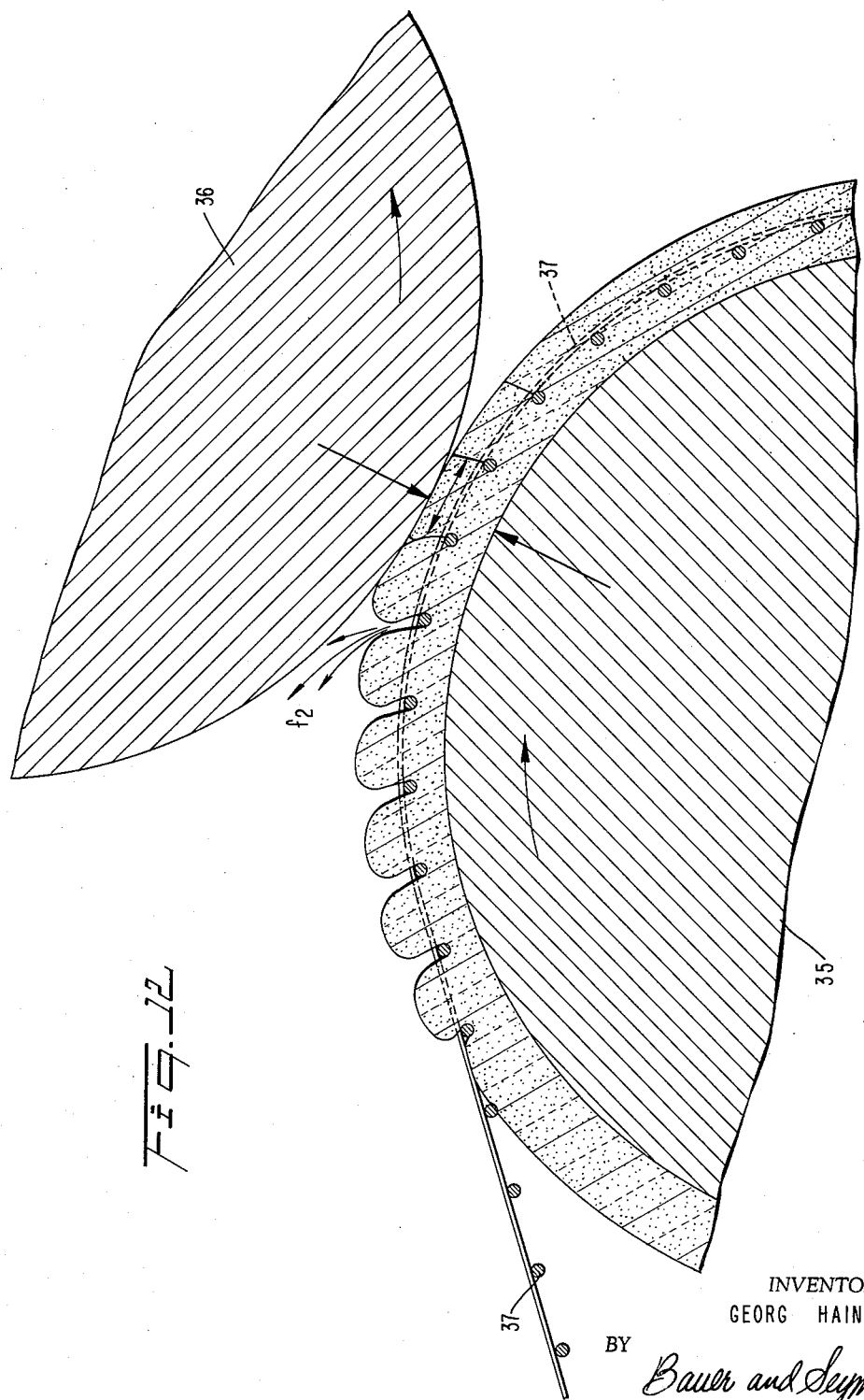
FIG. 12 is an enlarged scale section through the second upper roller of FIG. 10 showing the folding of the leading edge of a crevice upon the following edge by rolling pressure during the making of armored glass sheet.

The closing of the walls of the crevices made by the wires is easy because it deals with relatively small surfaces protected against cooling and interiorly heated. Experience shows that it is sufficient to apply a very low pressure on the roller 36 to accomplish the closing of the walls 44 and the unification of the sheet. The air or gases in the crevices are driven out (see arrows f2 in FIG. 12) during the closing of the crevices. One may advantageously proceed to close the crevices by using a pair of rollers which exert a radial pressure on the glass so that it does not deform the glass or the wire. One may operate, for example, using an upper roller constituted by a plurality of cylindrical elements susceptible of relative radial displacement as above described.

The support 34 between the two rollers may be replaced by a small roller, by a smooth surface, or by an air cushion. As rollers or smooth surfaces may mar the surface of the glass, the use of a cushion of air is especially advantageous. Such cushions are supplied by duct or tube located beneath the glass sheet having orifices to direct air against the otherwise-unsupported lower surface of the sheet.

After the second pair of rollers, the glass may be carried by any satisfactory means such as rollers 39.

Figure 11:
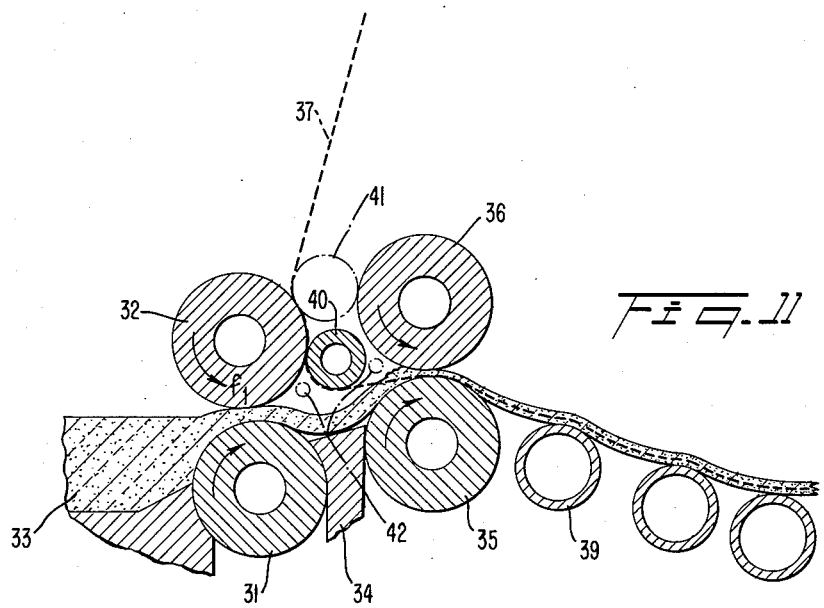
FIG. 11 is a modified form of FIG. 10.

In the modification represented in FIG. 11 the armor 37 is introduced by a special feeding roller 40 located between the sheet forming rollers. As a supplementary means of protection against oxidation of the wire one may by the use of upper roller 41 transform the space between rollers 32 and 36 into a protective chamber which receives a protective gas, such as a neutral or reductive gas, through an inlet 42.

The rollers 32 and 41 may be provided with helical surfaces acting to maintain the width of the glass sheet by gentle tension. Rollers 35 and 36 may be simultaneously displaced vertically in order to change the curvature of the camelback and the depth of penetration of the wire armor.

The thickness of the sheet between the pairs of rollers is set by the difference in linear speed imposed on the sheet by the respective pairs. This may be reduced to a pair of formulas:

$$V_1 = Le_1v_1$$
$$V_2 = Le_2v_2$$

in which $V_1$ is the volume of glass rolled by the first pair, L is the width of the sheet, $e_1$ is the thickness between the first pair and $v_1$ is the linear speed imposed by the first pair. The second formula has corresponding values for the second pair. Now, as $V_1$ should equal $V_2$, $$e_1v_1 = e_2v_2,$$

which is to say that the thickness of the completed ribbon should be inversely proportional to the linear speed of the train of rollers.

It may be useful in practicing the invention to give slightly higher speed to the second pair to tension the armor, and the thickness of the sheet may be regulated at will, by following the formula, but for many purposes equal peripheral speed of the two pairs of rollers is satisfactory.

The mass of glass above the first pair of rollers may be at the usual rolling temperature of about 1150 to 1170° C., introducing no change in rolling technique, and between the two pairs the upper part of the sheet remains hot enough to introduce the wire while the lower face is cooled enough by the lower roller and the means of support between the rollers to provide adequate rigidity. This is accomplished by cooling or heating roller 32 by internal cooling fluid to produce the right viscosity, or the roller 32 may be composed of heat insulating material, or it may be channelled to reduce contact with the sheet, or roller 31 may be efficiently cooled to produce a more rapid stiffening of the lower face of the sheet than of the upper. The lower the temperature of the sheet, the fewer the bubbles in the product after introduction of the armor, but this is limited by the necessity of providing enough plasticity for the introduction of the armor. The actual temperature required will depend on the viscosity curve of the glass. For instance, for glass of 71% $SiO_2$, 13–14% $Na_2O$, 12% $CaO$ and 3% $MgO$, the temperature of the internal midlayers of the sheet may be about 970° C. to 1000° C.

Although only a limited number of embodiments of the invention have been illustrated in the accompanying drawings and described in the foregoing specification, it is to be expressly understood that various changes may be made therein without departing from the spirit and scope of the invention, as will now be apparent to those skilled in the art.

What is claimed is:

1. In an apparatus for rolling sheet glass, a pressure-applying roller comprising a central shaft having a first longitudinal axis, a plurality of tubular cylindrical sections mounted in end-to-end contact for rotation on said shaft and in spaced relation along said shaft and for limited independent motion each in a respective plane normal to said axis, and means coupling each said section directly to the contiguous sections at opposite ends thereof, to thereby connect all said sections for rotation as a unit about said axis.

2. The apparatus of claim 1, a backing roller mounted for rotation about a second longitudinal axis parallel with and offset from said first axis, adjacent thereto, and means associated with each said roller section to urge the same with independently variable force toward said backing roller.

3. The apparatus of claim 2, said last-named means comprising a plurality of roller sections, a plurality of levers each journaling a respective one of said roller sections for independent rotation in rolling contact with a respective one of said cylindrical sections on the side thereof opposite said backing roller, and weight means slidable independently on and along each said lever to individually and controllably vary the force exerted by each said cylindrical section on said backing roller.

4. The apparatus of claim 1, and means operating to yieldingly engage and urge each end section of said pressure-applying roller toward the other and along said shaft, to thereby yieldingly maintain all said sections in continuous end-to-end contact.

5. A pressure roller for forming sheet glass, comprising, a central shaft having a first longitudinal axis, a plurality of tubular cylindrical sections mounted in end-to-end contact for rotation on said shaft and in spaced relation along said shaft and for limited movement, each independently, in a respective one of a plurality of planes normal to said axis, a plurality of sets of springs each said set being interposed between said shaft and a respective one of said sections, in equiangularly-spaced relation about said axis, to yieldingly and independently urge each said section into coaxial relation with said axis, and means independent of said springs and positively connecting said sections for rotation as a unit about said axis and enable universal movement of each said section in planes normal to the axis of said shaft, independently of contiguous sections.

6. The method of making reinforced sheet glass, comprising, passing molten glass to and between a first pair of horizontal, vertically-spaced presser rollers to form the glass into an incipient sheet, passing coolant through the lower roller of the first pair at a rate to lower the temperature of the lower surface of the sheet, while maintaining the temperature of the upper surface of the incipient sheet sufficiently fluid to accept the reinforcement, immediately and subsequently passing the incipient sheet to and between a second pair of horizontal vertically-spaced presser rollers to form the sheet progressively into a convex portion in its passage over the lower roller of the second pair, and introducing reinforcement into the upper surface of the convex portion, in advance of the second pair of rollers.

7. The method of producing reinforced sheet glass, comprising, passing molten glass to and between a first pair of horizontal, vertically-spaced presser rollers to form the glass into an incipient sheet, passing coolant through the lower roller of said pair to controllably reduce the temperature of the lower surface of the incipient sheet, immediately and subsequently passing the incipient sheet to and between a second pair of horizontal, vertically-spaced presser rollers to form the sheet progressively into a convex transient portion in its passage over the lower roller of the second pair, and introducing reinforcement into the incipient plastic sheet by passing the reinforcement into the upper surface of the convex portion, in advance of the second pair of rollers.

8. The method of claim 7, the reinforcement being introduced into the incipient sheet by passing the same about and beneath the upper roller of the first pair.

9. The method of claim 7, the reinforcement being introduced into the incipient sheet by passing the same about and beneath an auxiliary roller positioned between and parallel with the upper rollers of the first and second pairs.

References Cited by the Examiner

UNITED STATES PATENTS

| | | | |
|---|---|---|---|
| 697,229 | 4/02 | Appert | 65—255 |
| 858,366 | 7/07 | Baldwin | 65—150 |
| 1,135,937 | 4/15 | Franzen | 65—151 X |
| 1,232,107 | 7/17 | Shuman | 65—150 |
| 1,772,072 | 8/30 | Drake | 65—254 X |
| 1,901,743 | 3/33 | Forster | 65—148 |
| 2,545,728 | 3/51 | Everett | 65—32 |
| 2,908,486 | 10/59 | Thornburg | 65—356 |

FOREIGN PATENTS

| | | |
|---|---|---|
| 163,335 | 6/55 | Australia. |
| 1,202,834 | 7/59 | France. |
| 739,573 | 11/55 | Great Britain. |

DONALL H. SYLVESTER, *Primary Examiner*.

MORRIS O. WOLK, *Examiner*.